(12) United States Patent
Chu et al.

(10) Patent No.: US 9,237,525 B2
(45) Date of Patent: Jan. 12, 2016

(54) WGA STA POWER SAVING

(71) Applicant: STMicroelectronics, Inc., Coppell, TX (US)

(72) Inventors: Liwen Chu, San Ramon, CA (US); George A. Vlantis, Sunnyvale, CA (US)

(73) Assignee: STMICROELECTRONICS, INC., Coppell, TX (US)

( * ) Notice: Subject to any disclaimer, the term of this patent is extended or adjusted under 35 U.S.C. 154(b) by 15 days.

(21) Appl. No.: 14/199,774

(22) Filed: Mar. 6, 2014

(65) Prior Publication Data

US 2014/0185510 A1    Jul. 3, 2014

Related U.S. Application Data

(63) Continuation of application No. 13/113,574, filed on May 23, 2011.

(60) Provisional application No. 61/347,391, filed on May 22, 2010.

(51) Int. Cl.
*H04W 52/02* (2009.01)
*H04W 72/12* (2009.01)
*H04W 84/10* (2009.01)

(52) U.S. Cl.
CPC ...... *H04W 52/0258* (2013.01); *H04W 52/0216* (2013.01); *H04W 72/1263* (2013.01); *H04W 84/10* (2013.01); *Y02B 60/50* (2013.01)

(58) Field of Classification Search
CPC .............. H04W 52/0258; H04W 72/1263; H04W 52/0216; H04W 84/10; Y02B 60/50
See application file for complete search history.

(56) References Cited

U.S. PATENT DOCUMENTS

| 7,656,831 | B2 * | 2/2010 | Gao et al. ................. 370/311 |
| 8,274,894 | B2 * | 9/2012 | Kneckt et al. .............. 370/235 |
| 2003/0169697 | A1 | 9/2003 | Suzuki et al. |
| 2004/0171407 | A1 | 9/2004 | Ninomiya |
| 2004/0196800 | A1 | 10/2004 | Padovani et al. |
| 2005/0124294 | A1 | 6/2005 | Wentink |
| 2009/0196212 | A1 * | 8/2009 | Wentink .................. 370/311 |
| 2009/0279464 | A1 * | 11/2009 | Kakani et al. ............. 370/311 |
| 2010/0220690 | A1 * | 9/2010 | Majkowski et al. ......... 370/336 |
| 2011/0069650 | A1 * | 3/2011 | Singh et al. ............... 370/311 |
| 2011/0075642 | A1 | 3/2011 | Cordeiro et al. |
| 2011/0090833 | A1 * | 4/2011 | Kneckt et al. .............. 370/312 |
| 2011/0134852 | A1 * | 6/2011 | Cordeiro ................. 370/329 |
| 2011/0170468 | A1 | 7/2011 | Jain et al. |

\* cited by examiner

*Primary Examiner* — Jung Park
*Assistant Examiner* — Chuong M Nguyen
(74) *Attorney, Agent, or Firm* — Allen, Dyer, Doppelt, Milbrath & Gilchrist, P.A.

(57) ABSTRACT

This invention relates to switching power saving modes and rescheduling communication frames for various periods of a beacon interval (BI) defined under WGA Draft Specification 0.8 for the personal basic service set (PBSS) and infrastructure BSS to achieve further power savings and other advantages. Stations can be awake during a contention-based period (CBP) if it is in active state and can schedule frames during a service period (SP) to allow the assigned receiver to transmit to the assigned initiator. Stations in a group can schedule a group address frame to be sent during the CBP and group SP of a specific periodic BI. Stations in peer-to-peer connection may directly notify its peer stations of its power saving mode and wakeup schedule. Stations of an infrastructure basic service set (BSS) can also use the same power saving mechanism as stations of a PBSS noting a difference where each BI will be an access point's (AP's) awake BI.

6 Claims, 5 Drawing Sheets

WGA STA POWER SAVING

RELATED APPLICATION

This application claims the priority benefit of U.S. application Ser. No. 13/113,574 filed on May 23, 2011, which claims the priority benefit of provisional application Ser. No. 61/347,391 filed on May 22, 2010. The disclosures of the foregoing U.S. patent applications are specifically incorporated herein by this reference in their entirety and are assigned to STMicroelectronics, Inc., assignee of the present invention.

FIELD OF THE INVENTION

This invention relates to a method of saving power in wireless network devices, and more specifically, to a method of transmitting frames and switching the power saving mode of WGA network devices.

BACKGROUND OF THE INVENTION

The Wireless Gigabit Alliance (WGA) Draft Specification 0.8 (WGA-D08), January 2010, herein incorporated by reference, defines modifications to both the 802.11 physical layers (PHY) and the 802.11 Medium Access Control Layer (MAC) to enable operation in the 60 GHz frequency bank (mmWave) for very high throughput wireless networks.

The personal basic service set (PBSS) is a self-contained network which includes one PBSS control point (PCP) and other stations (STAs). Wireless communication is possible to all member STAs of the PBSS. The infrastructure BSS is a network which includes one access point (AP) and set of stations (STAs) that have successfully synchronized with the AP using the JOIN service primitives and one STA that has used the START primitive. Membership in a BSS does not imply that wireless communication with all other members of the BSS is possible. An AP in BSS serves as gateway to access another network, e.g., the Internet.

Section 9.23 of WGA-D08 defines the mmWave channel access. Channel access by a mmWave station (mSTA) during the Beacon Intervals (BI) and is coordinated by a schedule. The schedule of the data transfer time (DTT) of a BI is communicated through the Extended Schedule element in the Announce frame or the mmWave Beacon frame. The Extended Schedule element contains the scheduling information of all allocations in the DTT.

FIG. 1 shows an example BI structure as defined in WGA-D08. In a BI, the DTT is an access period during which frame exchanges are performed between STAs. The DTT is comprised of the contention-based access periods (CBPs) and service periods (SPs). SPs are allocated to specific transmitting and receiving STAs, and CBPs are not specifically allocated to any STA.

Section 11.2 of WGA-D08 defines power management modes for a wireless device working under mmWave channels. Table 44 lists the various power states for PCP and non-PCP STAs during the various access periods of an Awake BI.

TABLE 44

Power management states for an Awake BI (selected portions reproduced).

| BI Portion | PPS PCP | PS non-PCP STA |
|---|---|---|
| CBP marked as PCP available in the schedule | Awake | Awake Doze |
| CBP marked as PCP unavailable in the schedule | Doze | Awake Doze |
| SP with broadcast AID as Destination AID | Awake | Awake |
| Non-truncatable or non-extensible SP with non-PCP STA (excluding the PS STA) as Source AID and Destination AID | Awake Doze | Awake Doze |
| Truncatable SP or extensible SP with non-PCP STA (excluding the PS STA) as Source AID and Destination AID | Awake | Awake Doze |
| SPs allocated to itself | Awake | Awake |
| All other SPs | Awake Doze | Awake Doze |

However, the power management states are generically defined. There are many inefficiencies when working together with transmitting frames. Thus, there is a need for optimizing the switching of power management modes and transmitting frames.

Further, a mSTA may additionally work in an infrastructure BSS beyond the PBSS. An infrastructure BSS contains an AP providing access to another network, e.g., the Internet. All STAs within an infrastructure are required to be associated with the AP. WGA-D08 does not define a power saving mechanism for the infrastructure BSS; therefore, only 802.11 baseline power saving mechanism will be used in 60 GHz infrastructure BSS. Thus, there is a further need to implement a power saving mechanism for mSTAs that can work with both PBSS and 802.11 baseline power saving mechanisms.

SUMMARY OF THE INVENTION

The present invention is directed to a method of saving power in wireless network devices by switching power saving modes and transmitting frames of a BI.

In one embodiment of the present invention, stations can switch to awake during a CBP. Stations can further eliminate an Announcement Traffic Indication Message (ATIM) frame from the BI.

In another embodiment of the present invention, stations in a group can schedule a group address frame to be sent during the CBP and group address SP of an active group BI when all stations in the group are in active mode.

In yet another embodiment of the present invention, stations can change the transmission of frames during a SP to allow for the assigned service period receiver to transmit to the assigned service period initiator.

In further yet another embodiment of the present invention, stations in peer-to-peer connection can directly notify their peer stations upon switching back to active mode after switching to doze mode of its wakeup schedule and power saving mode.

In another embodiment of the present invention, stations of an infrastructure BSS may use the same method of saving power as stations of a PBSS noting a difference where each BI is AP's awake BI.

The foregoing and other features, utilities and advantages of the invention will be apparent from the following more particular description of an embodiment of the invention as illustrated in the accompanying drawings.

In addition, the features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

DETAILED DESCRIPTION

Figure 1:
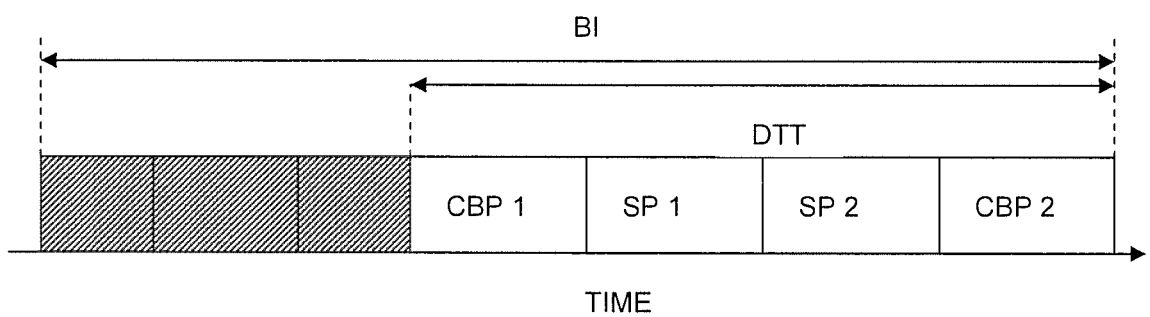
FIG. 1 shows the BI structure as defined in WGA-D08.

Embodiments of the present invention are hereafter described in detail with reference to the accompanying figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

The following description with reference to the accompanying drawings is provided to assist in a comprehensive understanding of exemplary embodiments of the present invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The invention relates to a novel method for saving power in wireless network devices. Embodiments of the invention are directed towards saving power in WGA network devices by re-scheduling communication frames and switching power saving modes for periods of inactivity. The method has added advantages of reducing retransmission, increasing the duration of the doze state for a device, and other advantages that may be learned in practice by one of ordinary skill in the art.

An active STA or a power save STA in its awake BI is switched to the active power management state during all CBP periods according to one embodiment of the invention.

Referring to Table 44, a STA in active mode and a power save STA in its awake BI can switch to doze mode in an awake BI during the CBP for a non-PCP STA. If a STA, e.g., STA1, transmits frames in a CBP to another STA in active mode, e.g., STA2, the frame transmission cannot be received correctly by STA2 if STA2 is in doze state. STA1 may have to retransmit frames several times before the frames are received correctly by STA2, thereby wasting power.

Section 11.2.3.1.3 of WGA-D08 further defines an Announcement Traffic Indication Message (ATIM) frame for an ATIM sender to notify that there are buffered frames for ATIM destination. Before transmitting frames to a STA in active mode in the CBP, a directed ATIM frame to the active STA may be required. This is not a good requirement, as explained in the following example. In each BI, a STA, e.g., STA1, needs to send an ATIM frame to each STA, e.g., STA2, for which STA1 has buffered frames in active mode so that STA2 will be awake in the CBPs. This makes the CBP transmission complicated. However, if the protocol mandates that each active STA is to be awake in each CBP, then if a STA has frames for an active STA, it can transmit frames to the active STA in each CBP without transmitting ATIM to the active STA.

Therefore, by mandating an active STA to be in awake state during all CBP periods, the complexity of power management is reduced by eliminating the need of transmitting the directed ATIM frame to the active STA before transmitting frames to a STA in an active mode in the CBP. The result is increased bandwidth and power saving as well as simplifying the CBP frame transmission protocol.

Figure 2:
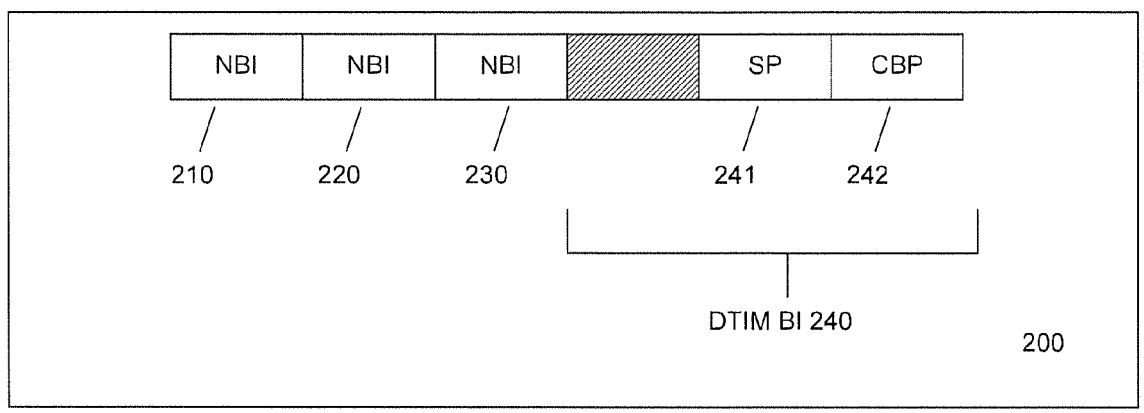
FIG. 2 shows a Delivery Traffic Indication Message (DTIM) BI with a group address frame in a CBP according to another embodiment of the invention.

FIG. 2 shows a DTIM BI with a group address frame in a CBP or SP according to another embodiment of the invention.

Group address frames are multiple destination broadcast frames that a STA can send to a group of STAs in its group SP or a CBP in its active BIs. However, with power saving mode considerations, other STAs may be in doze mode during such BIs. Thus, other STAs may not receive the group address frame sent by the STA. In other words, if a STA wants to receive group address frames, it has to be active in each BI. This is not good for saving power, thus a need for improvement exists.

Specific periodic BI is defined according to one embodiment of the invention. During such BIs, group address frames can be transmitted. During other BIs, group address frames are not transmitted. One example of a specific periodic BI can be a DTIM BI according to another embodiment of the invention. BI schedule 200 shows an example BI schedule consisting of normal beacon (NB) intervals 210, 220, 230, and a DTIM BI 240. Here, the group SP 241 is allocated in DTIM BI 240. The group address frames are transmitted in the group SP 241. The group address frames are transmitted in CBP 242 which is also allocated in DTIM BI 240. In normal beacon intervals 210, 220, 230, group address frames are not transmitted.

Figure 3:
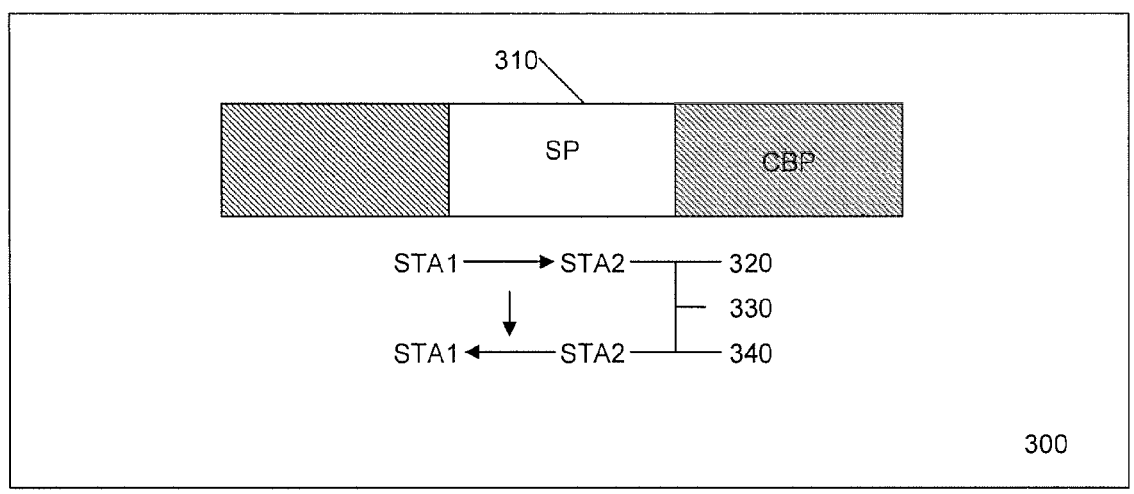
FIG. 3 shows a BI with a SP according to another embodiment of the invention.

FIG. 3 shows a BI with a SP according to yet another embodiment of the invention.

Normally, a SP in a BI is assigned exclusively to the SP's initiator and the SP's responder. Only the SP's initiator is allowed to transmit data and/or management frames, and only the SP's responder is allowed to receive such data and/or management frames if the reverse direction (RD) protocol is not supported. Therefore, bandwidth and power are wasted when the SP's initiator has nothing to transmit resulting in an idle channel in the SP.

BI 300 shows an example BI consisting of SP 310 assigned to a SP's initiator STA1 and a SP's responder STA2 according to one embodiment of the invention. During a first period 320 of SP 310, STA1 may send data and/or management frames exclusively, and STA2 may receive such frames from STA1 exclusively. When STA1 no longer has frames to transmit during the second period 330 of SP 310, it may be detected that the channel medium is idle for a point (coordination function) interframe space (PIFS) in the SP. According to another embodiment of the invention, the More Data bit in the frame control field of a data frame from SP initiator STA1 can be set to '0' to indicate that it has no more frames to transmit. Thereafter, the SP responder STA2 is allowed to transmit data and/or management frames to SP initiator STA1 during the third period 340 of SP 310. According to yet another embodiment of the invention, STA1 and STA2 can also choose to go to doze state if the More Data bit from SP initiator STA1 is set to '0' to indicate that it has no more frames to transmit.

Figure 4A:
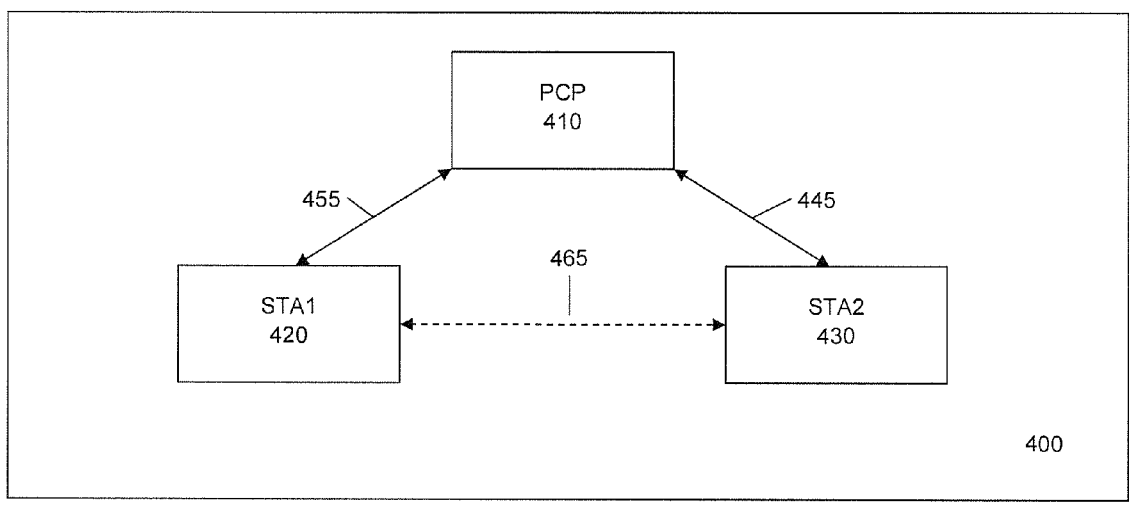
FIGS. 4A and 4B show a PBSS under direct peer notification according to another embodiment of the invention.
Figure 4B:
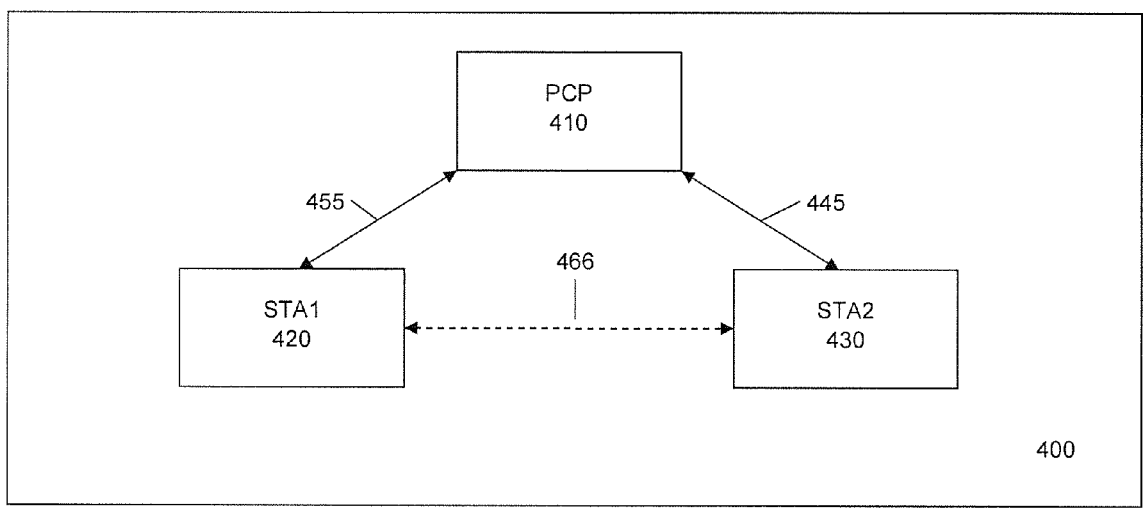

FIGS. 4A and 4B show a PBSS under direct peer notification according to further yet another embodiment of the invention. PBSS 400 has PCP 410, STA1 420, and STA2 430.

Normally, the wakeup schedule (WS) and power saving mode of STA1 420 and STA2 430 is stored with PCP 410. STA1 420 and STA2 430 can acquire the peer STA's WS and power saving mode through PCP 410.

Referring to FIG. 4A, STA1 420 and STA2 430 starts peer-to-peer communication 465. When STA2 430 changes from active mode to power saving mode or have a new wakeup schedule, STA2 430 transmits a power saving configuration to PCP 410 to be recorded. STA1 420, upon realizing that STA2 430 is no longer in active mode by realizing that an unsuccessful transmission threshold has been reached, may transmit an information request 455 to PCP 410 asking for the WS and power saving mode of STA2 430.

However, a STA may not always know when to acquire such wakeup and power saving schedule of its peer STAs if a STA changes from power saving mode to active mode. If STA2 430 returns to active mode, it is difficult for peer STA1 420 to decide when to re-acquire the WS and power saving mode of STA2 430 from PCP 410.

Direct peer notification, especially when a STA only has one peer STA, makes this notification simple and reasonable. Referring to FIG. 4B, when STA2 430 changes its power save state and/or wakeup schedule, STA2 430 may notify its wakeup schedule and/or power saving mode to peer STA1 420 directly via action frame 466. One example of such action frame may be information response frame. An information response frame is defined for the direct peer notification to indicate a new WS. A successful exchange of an information response frame between peer STA can be used to indicate a power saving mode change according to an embodiment of the invention.

An infrastructure BSS may also be adapted to use power saving modes and transmission frames of a PBSS with some modification according to another embodiment of the invention.

Section 11.2.3 of WGA-D08 discusses power management in a PBSS, but there is no power save protocol defined for a WGA infrastructure BSS. Two possible methods for implementing a power save protocol for a WGA infrastructure are using 802.11 baseline power save protocol defined for 2.4 GHz/5 GHz infrastructure BSS or using PBSS power save protocol. However, neither of these two methods is entirely appropriate. The 2.4 GHz/5 GHz infrastructure BSS does not have SP mechanism, and normally EDCA is the medium access method in all BI. Therefore, the 802.11 baseline power save protocol defined for 2.4 GHz/5 GHz infrastructure BSS is not appropriate for power save in a WGA infrastructure BSS. With the PBSS power save protocol, a PCP can be in doze state for several BIs. Thus, this violates the rules of infrastructure BSS since an AP is always awake in an infrastructure BSS in 2.4 GHZ/5 GHz band. Therefore, the unmodified PBSS power save protocol is also not appropriate for the WGA infrastructure BSS.

As such, the following describes power saving modes and transmission frames adapted for an infrastructure BSS according to one embodiment of the invention.

An infrastructure BSS necessary consists of an AP and associated non-AP STAs. The AP, similar to the PCP in a PBSS, should operate under rules different from a non-AP STA. The AP can be in doze state in SPs that are neither the SP initiator nor the responder where the SP is not a truncatable or extensible SP, since such a SP is exclusively allocated to SP's source and SP's destination. The AP will need to be awake in other periods of the BI. However, it is noted that the AP cannot sleep for several BIs under the conditions. In other words, each BI will be AP's awake BI. Since the AP should otherwise always be active, CBP power saving for the AP in an infrastructure BSS uses the same methods of CBP power saving in PBSS CBP.

A non-AP STA may be in doze state in SPs that the STA is not the SP's initiator or responder in its active BI. A non-AP STA may also be in doze state in the CBP in its active BI if it is in power saving mode. However, the non-AP STA in active mode shall be awake during all CBP according to one embodiment of the invention.

It is further noted that an infrastructure BSS can further adapt the same methods of SP power saving in a PBSS SP as discussed according to one embodiment of the invention.

A presently preferred embodiment of the present invention and many of its improvements have been described with a degree of particularity. It should be understood that this description has been made by way of example, and that the invention is defined by the scope of the following claims.

We claim:

1. A method of saving power for a millimeter wave (mmW) station capable of operating in both a mmW personal basic service set (PBSS) and an infrastructure BSS including an access point and associated stations, the method comprising:
   providing a control point in the mmW PBSS having a data transfer time schedule including contention-based periods and service periods; and
   providing a plurality of mmW stations in communication with the control point via the mmW PBSS, each mmW station having an awake mode and a sleep mode, the plurality of mmW stations being configured to
      during active beacon intervals, be in the awake mode during all of the contention-based periods,
      send data to other mmW stations in the mmW PBSS without sending an announcement message, and
      during respective service periods of the active beacon intervals, send data to a group of other mmW stations in the mmW PBSS without sending the announcement message by sending a message comprising a group address field, each addressee being in the awake mode.

2. The method of claim 1 wherein at least one of the plurality of mmW stations can eliminate the announcement message comprising an Announcement Traffic Indication Message (ATIM).

3. The method of claim 1 wherein mmW stations in a peer-to-peer connection directly notify peer mmW stations upon switching back to the awake mode after switching to the sleep mode of its wakeup schedule and power saving mode.

4. A communication system comprising:
   a millimeter wave (mmW) personal basic service set (PBSS) comprising a control point, and a plurality of mmW stations in communication with the control point; and
   an infrastructure BSS including an access point and associated stations; and
   a millimeter wave (mmW) station capable of operating in both said mmW PBSS and said infrastructure BSS;
   said mmW PBSS configured to
      provide the control point to have a data transfer time schedule including contention-based periods and service periods, and provide each mmW station having an awake mode and a sleep mode;

said the plurality of mmW stations being configured to
during active beacon intervals, be in the awake mode during all of the contention-based periods,
send data to other mmW stations in the mmW PBSS without sending an announcement message, and
during respective service periods of the active beacon intervals, send data to a group of other mmW stations in the mmW PBSS without sending the announcement by sending a message comprising a group address field, each addressee being in the awake mode.

5. The communication system of claim 4 wherein at least one of said plurality of mmW stations can eliminate the announcement message comprising an Announcement Traffic Indication Message (ATIM).

6. The communication system of claim 4 wherein mmW stations in a peer-to-peer connection directly notify peer mmW stations upon switching back to the awake mode after switching to the sleep mode of its wakeup schedule and power saving mode.

* * * * *